United States Patent
Jokic et al.

(10) Patent No.: US 6,595,602 B2
(45) Date of Patent: Jul. 22, 2003

(54) VEHICLE CONTROL OF A LOCKED DRIVE SYSTEM

(75) Inventors: Mile Jokic, Rochester, MI (US); Robert D. Kostadina, Royal Oak, MI (US); Martin Kuemmel, Hessen (DE); Markus E. Schneider, Hesson (DE); Christian H. P. Schumacher, Lake Orion, MI (US); William Skellenger, Clarkston, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 0 days.

(21) Appl. No.: 09/874,682

(22) Filed: Jun. 5, 2001

(65) Prior Publication Data
US 2002/0180265 A1 Dec. 5, 2002

(51) Int. Cl.$^7$ .................................................. B60T 8/60
(52) U.S. Cl. ........................ 303/147; 303/146; 303/190
(58) Field of Search ................................ 303/139, 140, 303/143, 146, 147, 148; 701/70, 71, 72, 82, 83

(56) References Cited

U.S. PATENT DOCUMENTS

| 4,657,310 A | 4/1987 | Klein |
| 4,789,207 A | 12/1988 | Wupper |
| 4,844,557 A | 7/1989 | Giers |
| 4,883,328 A | 11/1989 | Burgdorf et al. |
| 4,898,431 A | * 2/1990 | Karnopp et al. ............. 303/146 |
| 5,005,132 A | * 4/1991 | Yoshino ....................... 303/190 |
| 5,272,636 A | 12/1993 | Buschmann et al. ........... 701/72 |
| 5,277,481 A | 1/1994 | Weise et al. |
| 5,282,677 A | 2/1994 | Luetteke |
| 5,312,169 A | 5/1994 | Buschmann ................. 303/140 |
| 5,322,356 A | 6/1994 | Kolbe et al. ................. 303/139 |
| 5,762,406 A | * 6/1998 | Yasui et al. .................. 303/146 |
| 5,774,821 A | * 6/1998 | Eckert ........................... 701/83 |
| 5,865,513 A | * 2/1999 | Inagaki et al. ............... 303/146 |
| 5,869,943 A | * 2/1999 | Nakashima et al. ......... 303/146 |
| 6,301,541 B1 | * 10/2001 | Hosomi et al. ................ 701/81 |

OTHER PUBLICATIONS

Stability & Control—Taking Safety to the Next Level—Kim Wolfkill—Oct. 11, 2000.

* cited by examiner

Primary Examiner—Jack Lavinder
Assistant Examiner—Thomas J. Williams

(57) ABSTRACT

A vehicle includes multiple wheels, a locking drive differential, and a stability controller. A first wheel is mechanically coupled to a second wheel. The locking drive differential mechanically couples the second wheel to a third wheel. The stability controller is coupled to the third wheel. The stability controller is programmed to attain a slip rate of about the first and the second wheel at the third wheel, which stabilizes the vehicle in an over-steer condition. The method applies a modulated stability pressure to the third wheel until the third wheel attains about the combined slip rate of the first wheel and the second wheel and a fourth wheel is rotating at about the velocity of the vehicle.

22 Claims, 6 Drawing Sheets

VEHICLE CONTROL OF A LOCKED DRIVE SYSTEM

1. FIELD OF THE INVENTION

This invention relates to vehicle stability, and more particularly, to a system and a method that enhance directional stability in locked drive systems.

2. BACKGROUND OF THE INVENTION

Locked drive systems lock the front and the rear axles of a vehicle through a transfer case. The systems distribute torque to the front and the rear wheels, which improves traction and operator control in many circumstances. A locked drive system can include a locking differential that distributes a percentage of the engine and brake torque to the front and the rear axles. This distribution can enhance off-road performance, and in some instances, enhance driver control.

Sophisticated control systems, such as an Antilock Braking System (ABS) and a stability control system, are available on some locked drive systems. ABS modulates brake pressure during a hard braking maneuver to avoid wheel lock-up and a loss of steering control. A stability control system regulates engine torque and wheel braking when an operator loses a degree of control. While each of these systems is designed to provide maximum vehicle stability, the combination of the ABS, the stability control system, and a locked drive system can induce greater vehicle instability in some driving conditions.

In an over-steer event, for example, the ABS, the stability control overlay system, and the locked drive system can create vehicle instability by transferring front brake torque and engine torque to the rear axle. In the over-steer event, the rear of the vehicle slides, "fishtailing," toward the outside of a turn, which causes the vehicle to yaw. As the rear wheels slide, the driver loses a degree of control. To avoid the spin, the stability control system brakes the outside front wheel. This brake pressure is designed to bring the rear wheels in alignment with the front wheels and provide a maximum stopping distance and an enhanced wheel control. In a locked drive system, however, a portion of this braking force combined with the engine torque is distributed to the rear axle. This additional torque slows down the rear wheels relative to the vehicle's speed, which can increase tire slippage and cause even greater traction losses. Accordingly, there is a need for a locked drive system that can enhance vehicle stability under all driving conditions.

BRIEF DESCRIPTION OF THE DRAWINGS

The dashed lines drawn in FIGS. 2 and 6 represent direct and indirect connections. As shown in FIGS. 2 and 6, other circuitry may be electrically coupled between the controller and the respective ESP and ABS controls. Similarly, the dashed lines drawn in FIG. 5 illustrate that other acts can occur before or after each illustrated act and that some acts are not necessarily executed.

DETAILED DESCRIPTION OF THE PRESENTLY PREFERRED EMBODIMENTS

Embodiments of the system and the method of the present invention described below provide significant improvements in maintaining vehicle control in an over-steer event. The system and the method utilize brake modulation, and in some situations, power management to provide maximum stability when the rear of a vehicle brakes into a slide. The system and the method counteracts the effects of a loss of rear traction due to adverse road conditions, a sudden acceleration, a sudden swerve, a sudden braking, a load change, etc., that create vehicle instability. The system and method may coordinate a stability control system, a traction control system, a braking system, and in some instances, a power management system.

Figure 1:
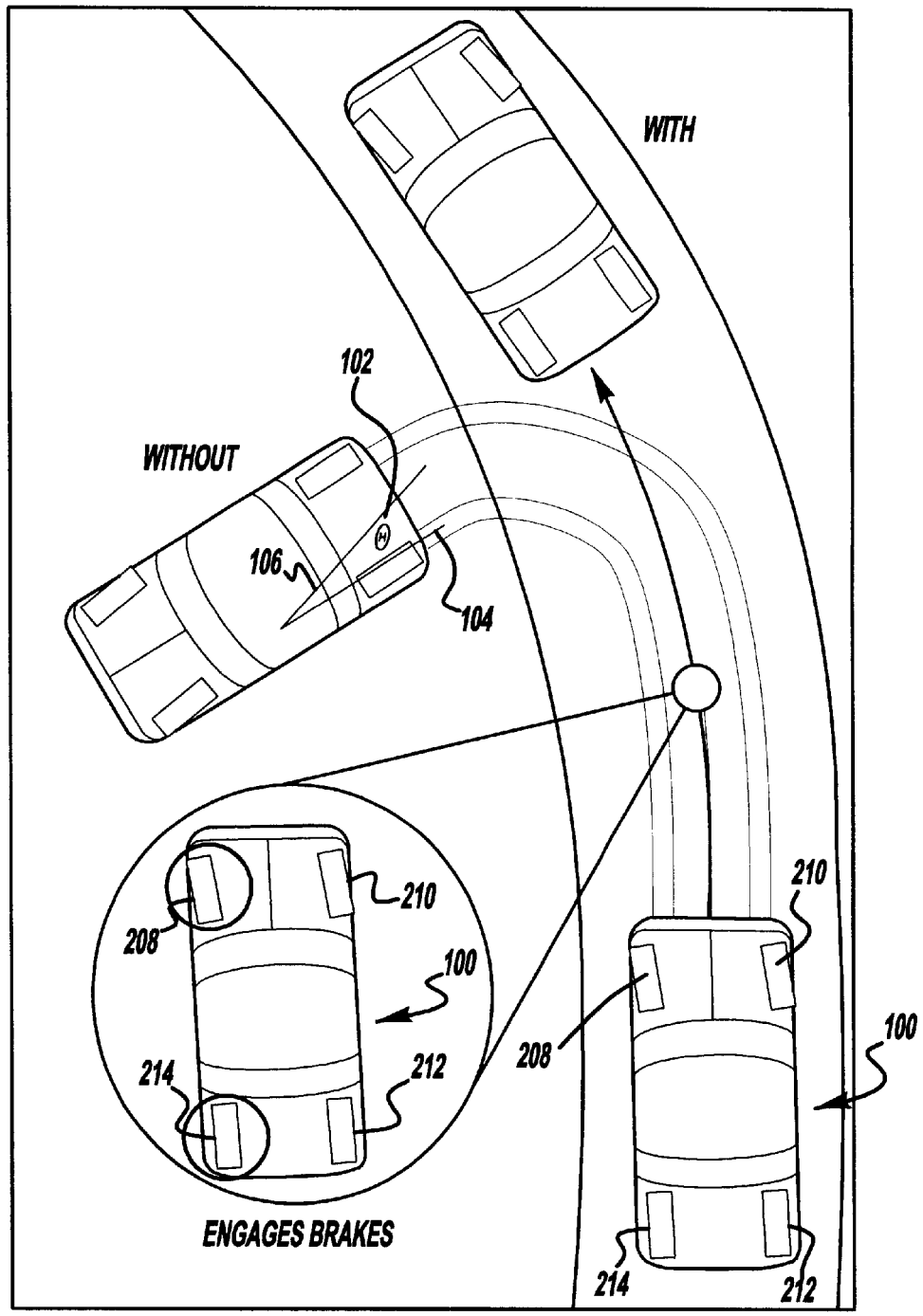
FIG. 1 is an illustration of a modulated braking strategy of a vehicle incorporating a preferred embodiment of the invention and an illustration of a second vehicle without a preferred embodiment of the invention.
Figure 2:
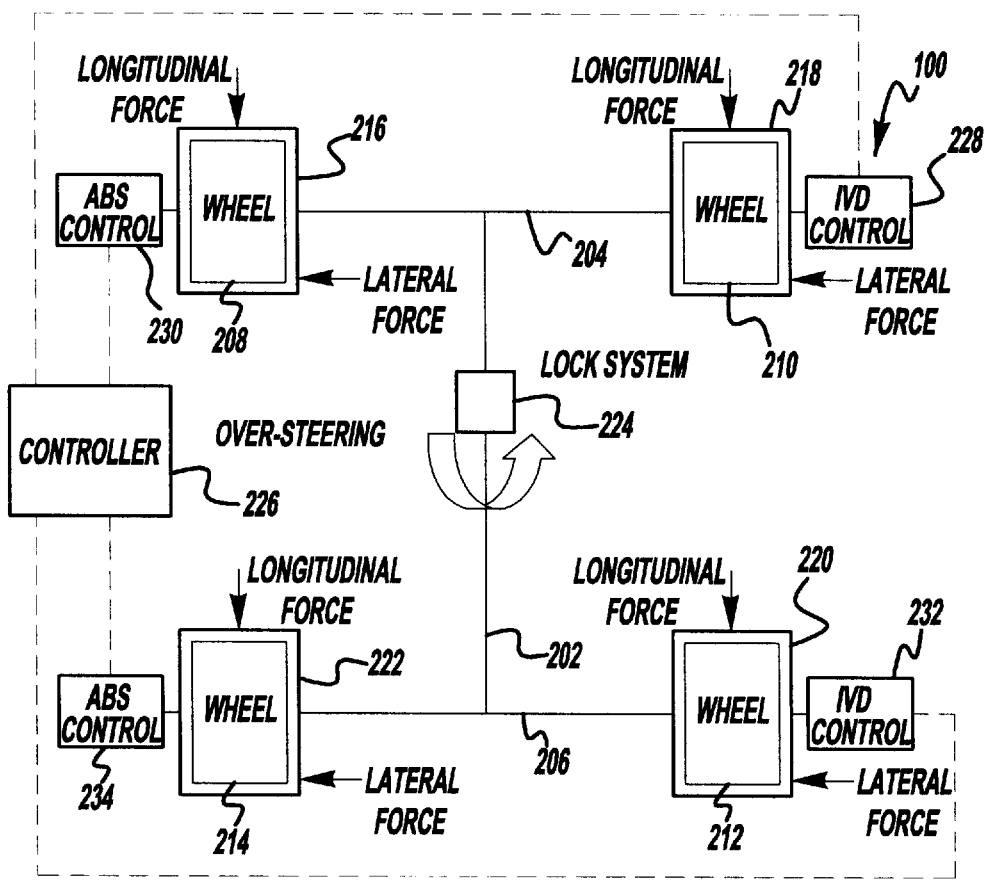
FIG. 2 is a schematic illustration of a vehicle of a preferred embodiment.

FIGS. 1 and 2 illustrate partial diagrams of a vehicle 100 incorporating an embodiment of the invention. The vehicle 100 includes a drive shaft 202 and a pair of drive axles 204 and 206. The drive shaft 202 transmits power from a power source, which may be an engine, a fuel cell, an electric cell, or a power cell, for example, to the front and the rear drive axles 204 and 206. The front and rear drive axles 204 and 206 include a pair of front wheels 208 and 210 and front tires 216 and 218 and a pair of rear wheels 212 and 214 and rear tires 220 and 222, respectively.

The wheels 208, 210, 212, and 214 are controlled, in part, by braking means or a braking system and a traction control system (TCS) system. The braking systems shown in FIGS. 1 and 2 are Anti-lock Brake Systems (ABS) that modulate brake pressure to forestall wheel lock-up. The ABS include wheel sensors, such as wheel mounted sensors, for example, that track wheel rotation and electronics that cyclically pulse brakes through phases to provide better stopping and steering control during hard braking maneuvers. Preferably, the phases describe a temporal relationship between vehicle speed and wheel speed. Many other relationships can be utilized in alternative embodiments. The TCS system is preferably an all-speed design that employs brake power management or both brake and power management control to avoid traction loses that can occur because of adverse road conditions or sudden accelerations. Like the ABS, the TCS system counteracts forces that impair longitudinal and lateral yaw stability.

While the ABS and the TCS systems compensate for longitudinal forces, a stability control system, such as an Integrated Vehicle Dynamic™ (IVD) system, or an Electronic Stability Program (ESP) counteracts yaw forces that can cause vehicle instability. Vehicle instability, for example, may be caused by a sudden steering maneuver, by road conditions, or by many other conditions that cannot be compensated by the ABS and/or the TCS. The ESP system compares the vehicle's speed and direction to the driver's steering, acceleration, and braking control. Using a variety of sensors, such as for example, a yaw rate sensor that measures the degree of rotation about a horizontal axis, a longitudinal sensor that measures the lateral forces generated by a vehicle's motion, a lateral sensor, and a steering angle sensor, the ESP system utilizes ABS components and a power management system, in some instances, to enhance lateral stability. The power management system may include a throttle control, fuel control, and/or ignition control, for example.

Referring to FIGS. 1 and 2, the system further includes a locking center differential 224 that uses a system of gears between the front and the rear wheels 208, 210, 212, and 214 to transmit power from the power source to the front and rear axles 204 and 206. Preferably, the differential 224 accommodates all wheel drive, full-time four-wheel drive, and/or on demand four-wheel drive systems. The locking center differential 224 of this preferred embodiment provides a 50/50 front/rear torque split, meaning that the locking center differential 224 divides power source and brake torque equally between the front and the rear axles 204 and 206. In alternative embodiments, the locking center differential 224 divides power source and brake torque by many other front/rear torque splits. Accordingly, the preferred embodiments are not limited to a 50/50 front/rear torque split.

Figure 4:
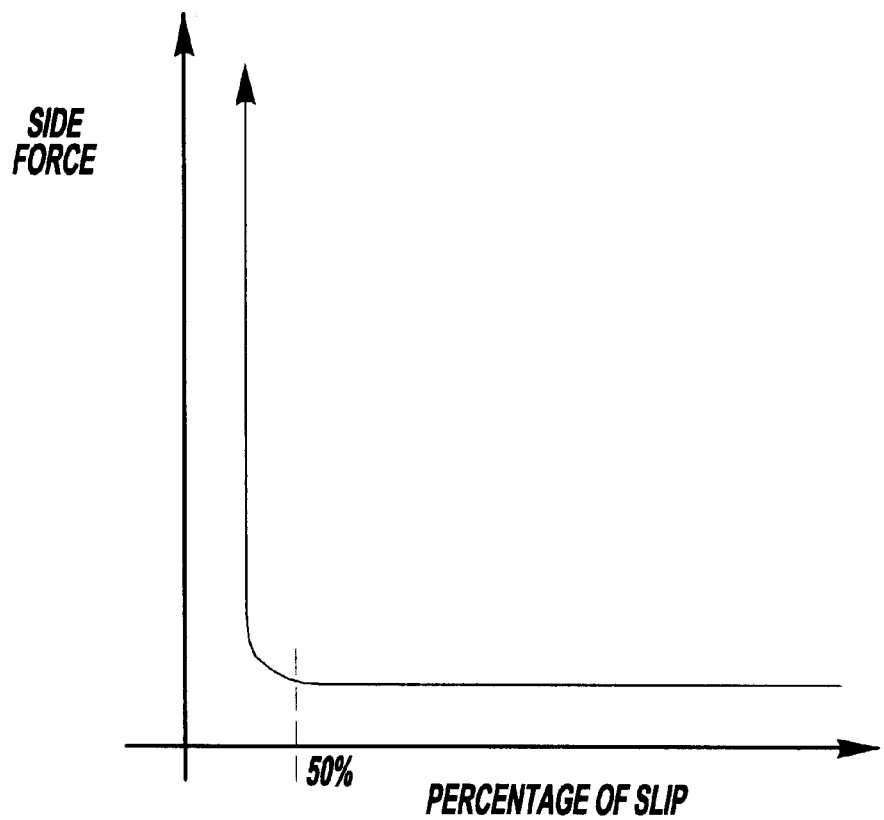
FIG. 4 is a conceptual graph of the lateral forces versus the percentages of wheel slip for the vehicle of FIG. 2.

Referring to FIGS. 1 and 2, the system and method of this preferred embodiment is shown compensating for an over-steer event occurring in a counter clockwise turn. In the over-steer event, the rear wheels 212 and 214 of the vehicle 100 are "fishtailing" toward the outside of a turn, causing the vehicle 100 to turn more sharply and approach a spin. As the vehicle 100 negotiates the turn, the rear tires 220 and 222 have a greater slip angle $\Theta 102$ than the front tires 216 and 218 (illustrated for wheel 214 in FIG. 1). The slip angle $\Theta 102$ is the angle formed by a plane of rotation of a wheel 104 with that wheel's plane of travel 106. As the force transmitted from the rear axle 206 to the ground exceeds the resistance between the rear tires 220 and 222 and the ground, the rear wheels 212 and 214 spin and the rear tires 220 and 222 lose the lateral forces that maintain the vehicle's 100 directional stability (i.e., the rear tires 220 and 222 percentage of slip exceed 50%; See FIG. 4).

As the vehicle 100 enters the over-steer condition, a controller 226 recognizes the condition and intervenes when the driver's input is not effective in controlling the vehicle 100. Preferably, the controller 226 compares the current condition of the vehicle 100 with an expected vehicle condition before engaging the ESP, and in some instances, the power management systems.

Once an over-steer condition is detected, the system and method of this preferred embodiment applies selective braking. The outside wheels 210 and 212 are controlled by ESP systems 228 and 232 and the inside wheels 208 and 214 are controlled by a driver actuated ABS 230 and 234. Vector lengths in FIG. 2 illustrate the relative magnitudes of the longitudinal and the lateral forces of this preferred embodiment. As shown, the ESP control 228 of wheel 210 is programmed to maximize the longitudinal force acting on wheel 210 while minimizing the lateral force acting on wheel 210. The ABS control 230 of wheel 208 similarly is programmed to maximize the longitudinal force acting on wheel 208, and is also programmed to sustain an approximately equal lateral force on wheel 208.

The locking center differential 224 distributes the brake torque created by the ABS and ESP systems 228, 230, 232, and 234 and the power source (e.g., the engine) torque between the front and the rear axles 204 and 206. The additional force distributed to the rear axle 206 increases the risk of rear tire slippage if the torque is not redistributed between the rear wheels 212 and 214. The additional torque created by the ABS and the ESP systems 228 and 230 in an over-steer condition is transmitted through the rear drive axle 206, wheels 212 and 214, and the tires 220 and 222 to the ground. This transfer reduces the rear wheels' 212 and 214 speed relative to the vehicle's 100 velocity.

Figure 3:
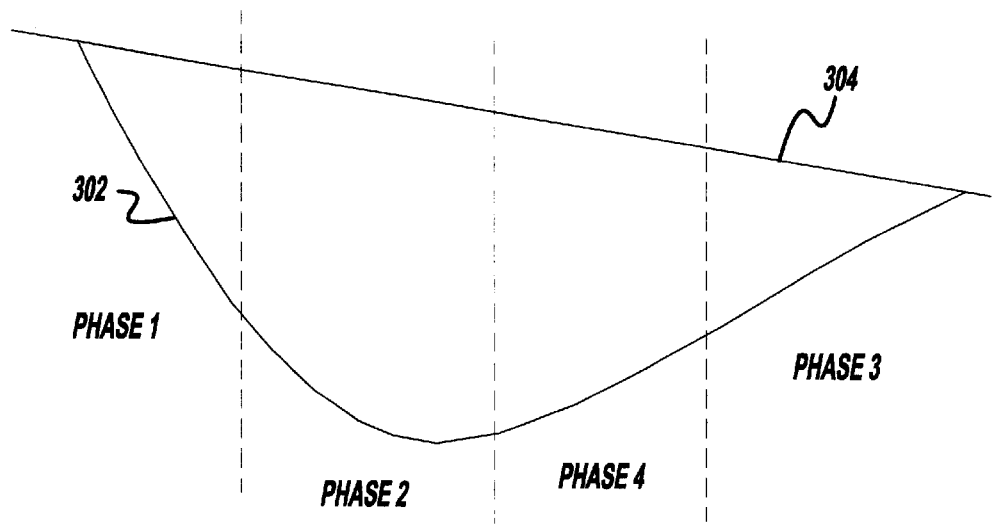
FIG. 3 is a graph of the phases of an Antilock Brake System of FIG. 2.

As shown in FIG. 3, wheel speed 302 does not follow an actual or a calculated vehicle speed 304 under modulated braking control, such as an ABS control. As the actual speed of a wheel 302 approaches the vehicle's speed 304, a brake becomes more effective, which allows the vehicle 100 to stop in a shorter distance. The ABS strategy in this embodiment cycles though phases. Each of the wheels is controlled independently, and therefore, can rotate at different velocities. If any wheel approaches lock-up, the ABS control of that wheel releases brake pressure. The order and the number of phases selected by the ABS acting on a given wheel may vary. Factors such as wheel speed and the magnitude of the forces acting on that wheel can affect selection and order. Since disc brakes have become popular because of their fade resistance, FIG. 3 is described in relation to a disc or a drum design. In a disc design, each wheel has a hub-mounted disc and a caliper coupled to the vehicle's suspension. The caliper employs a friction pad assembly actuated by a fluid pressure, such as a mechanical, hydraulic, pneumatic, or vacuum pressure, for example. Of course, the braking system and the braking means of the preferred embodiments encompass any mechanical and electrical device that slows or stops rotating motion by contact friction or magnetic force using one or more phases with independent or dependent wheel control.

As shown in FIG. 3, the wheel enters ABS control in Phase 1. In this phase, a caliper applies pressure to the friction pad assembly. As the wheel approaches lock-up in Phase 2, the ABS releases caliper pressure to sustain wheel rotation. In Phase 4, a continuous caliper pressure is maintained as the velocity of the wheel increases. In Phase 3, the ABS increases caliper pressure as the velocity of the wheel approaches the velocity of the vehicle. In this embodiment, the ABS dissipates a significant amount of linear kinetic energy by friction contacts resulting in a non-linear wheel velocity.

The degree of control and stability in this preferred embodiment depends in part, on the system and method's redistribution of torque to rear wheels 212 and 214 based on an analysis of slip and wheel speed. Because the locking center differential 224 provides a different front/rear torque split, the locking center differential divides vehicle power source and brake torque between the front and the rear axles 204 and 206. For the purposes of explanation, a 50/50 front/rear torque split will be used. Accordingly, the locking center differential divides vehicle power source and brake torque equally between the front and the rear axles 204 and 206 in this preferred embodiment.

The torque distribution is illustrated in terms of the slip rate represented in Equation 1:

$$\% S_{Wheel\ 208} + \% S_{Wheel\ 210} = \% S_{Wheel\ 212} + \% S_{Wheel\ 214} \quad \text{(Equation 1)}$$

where the slip rate is the magnitude differential between the circumferential velocity of a wheel ($V_{Wheel\ n}$) at a contact surface (i.e., the ground) and a calculated or measured vehicle velocity (VV). This relationship may be expressed as:

$$\% S_{Wheel\ n} = [(VV - V_{Wheel\ n})/VV] \times 100 \quad \text{(Equation 2)}$$

Substituting Equation 2 into Equation 1 yields Equation 3:

$$V_{Wheel\ 208} + V_{Wheel\ 210} = V_{Wheel\ 212} + V_{Wheel\ 214} \quad \text{(Equation 3)}$$

By way of example, assume $V_{Wheel\ 208}$=80 km/hr, $V_{Wheel\ 210}$=50 km/hr, and VV=100 km/hr, then $\% S_{Wheel\ 208}$=20% and % $S_{Wheel}210$=50%, and the slip transferred to the rear axle is % $S_{Wheels\ 212\ plus\ 214}$=70% according to Equation 1.

To maximize the traction of the rear inner wheel 214 shown in FIGS. 1 and 2, the ESP control 232 is programmed to maximize the longitudinal force acting on the rear outside wheel 212. The rear outside wheel 212 is braked by a modulated pressure until the rear outside wheel 212 attains the combined slip of the front wheels 208 and 210. In this example, ESP control of the rear outside wheel 212, brakes wheel 212 until a slip rate of 70% is attained. With % $S_{Wheels\ 212}$=70% and the VV=100, then $V_{Wheel\ 212}$=30 km/hr according to Equation 2 and $V_{Wheel\ 214}$=100 km/hr. At this point, the resistance between the contact surface and the rear inside wheel 214 and the lateral force acting on rear inside wheel 214 are maximized, as wheel 214 is traveling at vehicle velocity (i.e., $V_{Wheel\ 214}$=VV).

To sustain maximum traction at the rear inside wheel 214, the system and method of this embodiment implements an inverse braking strategy through an ESP system to control the rear outside wheel 212. The system and method calculates or references the ABS phase of the rear inside wheel 214, to determine the phases for the rear outside wheel 212. In this strategy, if the ABS phase of the rear inside wheel 214 dictates an increase in caliper pressure, the ESP control of the rear outside wheel 212 releases caliper pressure. Similarly, if the ABS phase of the rear inside wheel 214 dictates a release of caliper pressure, the ESP control of the rear outside wheel 212 increases caliper pressure. The ESP control of the rear outside wheel 212 follows the ABS phases of the rear inside wheel 214 when a continuous caliper pressure is maintained, such as occurs in Phases 1 and 4. While the order of the ABS phases of the inside wheels 208 and 214 cycle through Phases 1, 2, 4, and 3, the ESP control 232 at the rear outside wheel 212 cycles through these same phases in a different order, Phases 3, 4, 2, and 1. Preferably under these conditions, no brake pressure is applied to wheel 222 in this preferred embodiment. Of course, the number of phases selected by the ESP control 232 of the rear outside wheel 212 may vary in alternative embodiments or may vary according to driving conditions.

Figure 5:
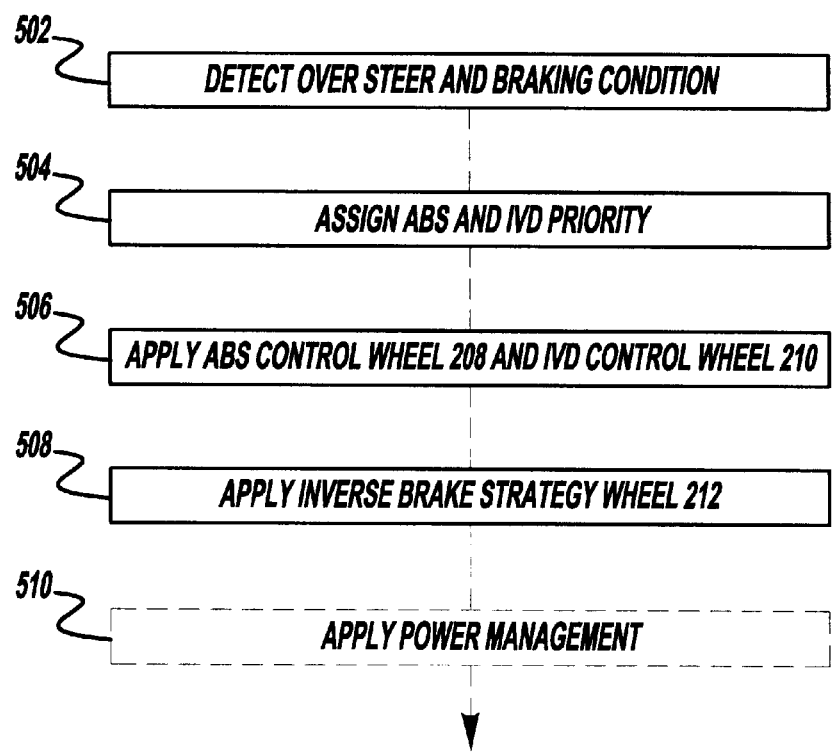
FIG. 5 is a flow diagram for operation of the vehicle of the embodiment of FIG. 2.

FIG. 5 is a flow diagram of an embodiment of a vehicle in an over-steer condition in a counter-clockwise turn. At step 502, an over steer condition is detected. Preferably, a controller 226 compares the current driving conditions to an expected driving condition. At step 504, the controller 226 intervenes, assigning ABS priority to the inside wheels 208 and 214 and ESP priority to the outside wheels 210 and 212. At step 506, ABS control of the inside front wheel 208 maximizes the longitudinal force and sustains an approximately equal lateral force on the inside front wheel 208. Similarly, ESP control of the outside front wheel 210 maximizes the longitudinal force but minimizes the lateral force acting on the outside front wheel 210. At step 508, the rear outside wheel 212 is braked by a modulated ESP pressure until the rear outside wheel 212 attains the combined slip rate of the front wheels 208 and 210. An inverse braking strategy controls the outside rear wheel 212 to maintain the inside rear wheel 214 velocity at the velocity of the vehicle 100. At an optional step 512, the controller 226 maintains or reduces the power source torque distributed to the front and rear axles 204 and 206. Power management may occur through any system or method and may include throttle control, fuel control, or ignition control, for example.

Figure 6:
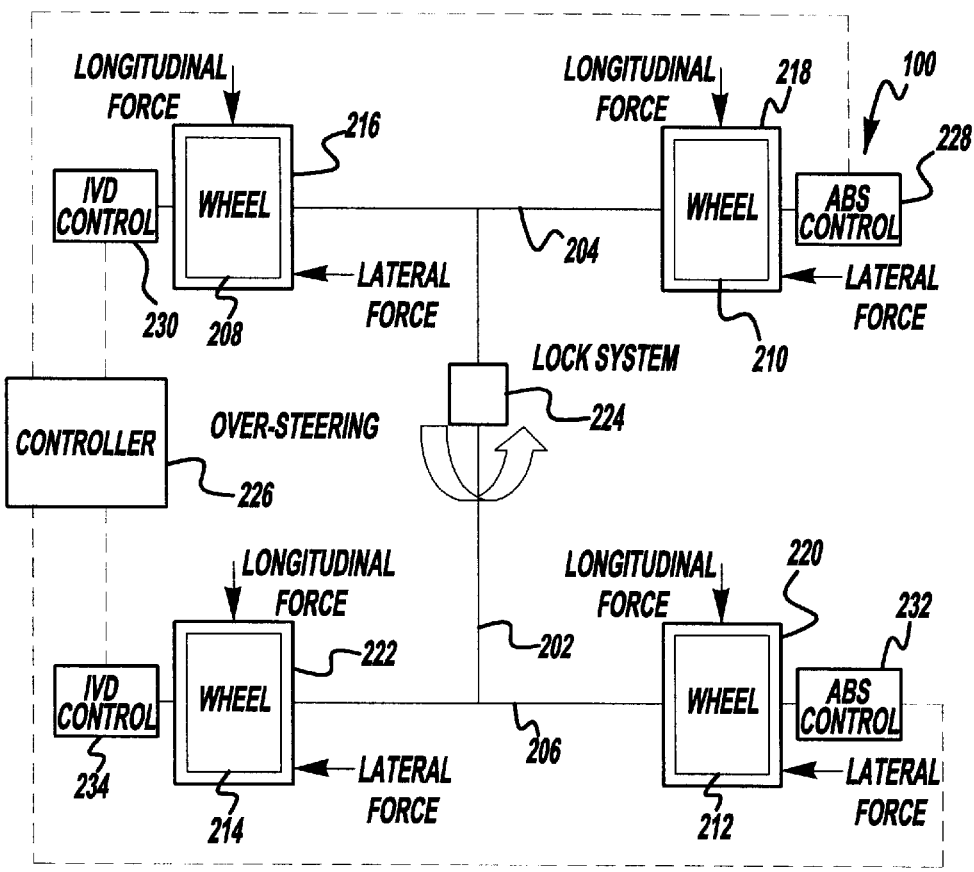
FIG. 6 is a schematic illustration of a vehicle of a second preferred embodiment.

The system and method of the invention can improve vehicle 100 stability when an over steer condition is detected in a clockwise turn as well. When an over-steer condition is detected in a clockwise turn, ESP control has priority of the outside wheels 208 and 214 and ABS control has priority of the inside wheels 210 and 212 as illustrated in FIG. 6. To sustain traction at the inside rear wheel 212, the system and method of this embodiment implements an inverse braking strategy to control the outside rear wheel 214. The system and method calculates or references the ABS phases of the inside rear wheel 212, to generate the phases that control the outside rear wheel 214. Of course, ABS control is also available on the inside rear wheel of vehicle 100 on all of the embodiments to ensure that the inside rear wheel tracks vehicle 100 velocity.

The invention is not limited to a particular locking center differential 224 or to a specific transfer case. Any suitable coupling of the front axle 204 to the rear axle 206 may be used. The invention encompasses both mechanical and fluid coupling of the front and the rear axle 204 and 206, for example. Furthermore, the invention is not limited to a 50/50 front/rear torque split. The percentage of front/rear torque can vary in alternative embodiments of the invention.

Many other alternatives are also possible. For example, the invention may be implemented in a braking system or a stability control system through software (i.e., a sequence of instructions that may be executed by logic circuitry or electronics and/or may be retained in a storage medium such as memory) or by electronic hardware alone. The invention may be also integrated within or made unitary to a stand-alone controller that performs system braking, stability control, and when needed, power management functions or merely an existing controller that coordinates the functionality of the control modules that manage a vehicle.

The invention provides a sophisticated system and method that analyzes longitudinal and lateral forces to enhance stability in locked drive systems. When an impending over-steer condition is detected, the system and the method of the invention seamlessly intercedes through braking and stability control systems to provide maximum stability through many driving situations. For example, when maneuvering through a turn, a sudden braking, a quick acceleration, or a loss of traction, the invention regains vehicle stability.

The foregoing detailed description describes only a few of the many forms that the present invention can take and should therefore be taken as illustrative rather than limiting. It is only the claims, including all equivalents, that are intended to define the scope of the invention.

What is claimed is:

1. A vehicle, comprising:
   a first wheel;
   a second wheel mechanically coupled to the first wheel;
   a locking drive differential mechanically coupled to the second wheel;
   a third wheel mechanically coupled to the locked drive differential; and
   a stability controller coupled to the third wheel, the stability controller being programmed to attain a slip rate at the third wheel that is about equal to the sum of slip rates at the first wheel and the second wheel when stabilizing the vehicle in an over-steer condition.

2. The vehicle of claim 1 further comprising a brake controller mechanically coupled to the first wheel, the brake controller comprising a program that maximizes a longitudinal force acting on the first wheel.

3. The vehicle of claim 2 further comprising a controller in communication with the stability controller and the brake controller.

4. The vehicle of claim 1 further comprising a second stability controller mechanically coupled to the second wheel, the stability controller comprising a program that maximizes a longitudinal force acting on the second wheel.

5. The vehicle of claim 4 further comprising a controller in communication with the first and the second stability controller.

6. The vehicle of claim 1 further comprising a braking controller mechanically coupled to the first wheel and a stability controller mechanically coupled to the second wheel.

7. The vehicle of claim 1 wherein the locking drive differential defines a portion of a torque split.

8. The vehicle of claim 1 wherein the program comprises a sequence of instructions that executes an inverse braking strategy.

9. The vehicle of claim 1 further comprising a fourth wheel rotatably coupled to the locking drive differential.

10. The vehicle of claim 9 wherein the program comprises a sequence of instructions capable of controlling the velocity of the fourth wheel.

11. The vehicle of claim 9 wherein the program comprises a sequence of instructions capable of maintaining the velocity of the fourth wheel at a velocity of the vehicle.

12. The vehicle of claim 1 wherein the stability controller is an Electronic Stability Program.

13. The vehicle of claim 1 wherein the locking drive differential distributes the torque of the first wheel and the second wheel to the third wheel, and the brake controller almost equally.

14. The vehicle of claim 1 further comprising a power management system in communication with the stability controller to reduce a torque on the first wheel, the second wheel, and the third wheel.

15. A vehicle, comprising:
a first wheel;
a second wheel mechanically coupled to the first wheel;
a locking drive differential mechanically coupled to the second wheel;
a third wheel mechanically coupled to the locking drive differential;
a fourth wheel mechanically coupled to the locking drive differential; and
a controller coupled to the third wheel, the controller being configured to assign a slip rate to the third wheel that is about equal to the sum of slip rates at the first wheel and the second wheel and to use an inverse braking strategy to achieve the assigned slip rate at the third wheel for stabilizing the vehicle in an over-steer condition.

16. The vehicle of claim 15 wherein the controller includes instructions that control the inverse braking strategy.

17. A method of stabilizing a vehicle in an over-steer condition, said vehicle comprising wheels mechanically coupled to a locking drive differential, said method comprising:
detecting an over-steer condition;
assigning brake control priority to a first wheel and a fourth wheel;
assigning stability control priority to a second wheel and a third wheel; and
applying braking pressure to the third wheel until the third wheel attains a slip rate about equal to the sum of the slip rates of the first wheel and the second wheel where the fourth wheel is rotating at about a velocity of the vehicle.

18. The method of claim 17, further comprising applying a stability control pressure to the second wheel.

19. The method of claim 17 further comprising reducing the torque applied to the first wheel, the second wheel, the third wheel, and the fourth wheel.

20. The method of claim 17 wherein the act of applying a modulated stability control pressure utilizes modulated stability control software.

21. A stability controller for a vehicle comprising a locking drive differential and a first wheel, a second wheel, a third wheel and a fourth wheel mechanically coupled to the locking drive differential; said stability controller comprising:
a logic circuit;
a memory interfaced to the logic circuit; and
software comprising instructions that may be executed by the logic circuit to stabilize the vehicle in an over-steer condition by attaining a slip rate at the third wheel about equal to the sum of slip rates at the first and second wheels.

22. The controller of claim 21 wherein the instructions execute an inverse braking strategy.

* * * * *